United States Patent Office 3,031,020
Patented Apr. 24, 1962

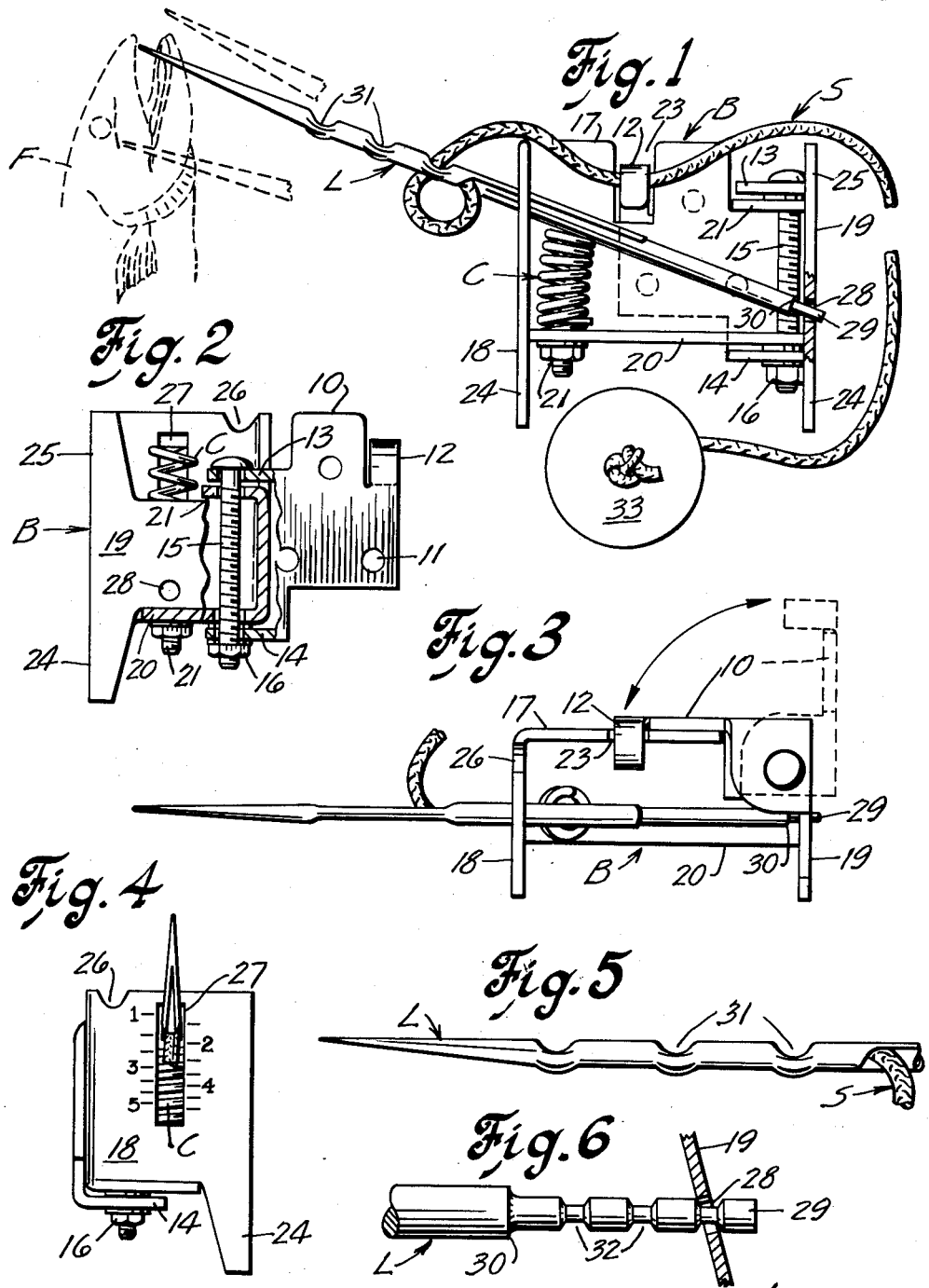

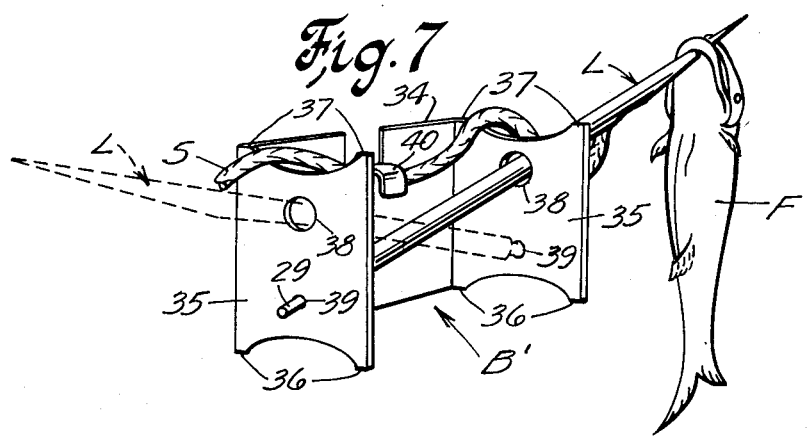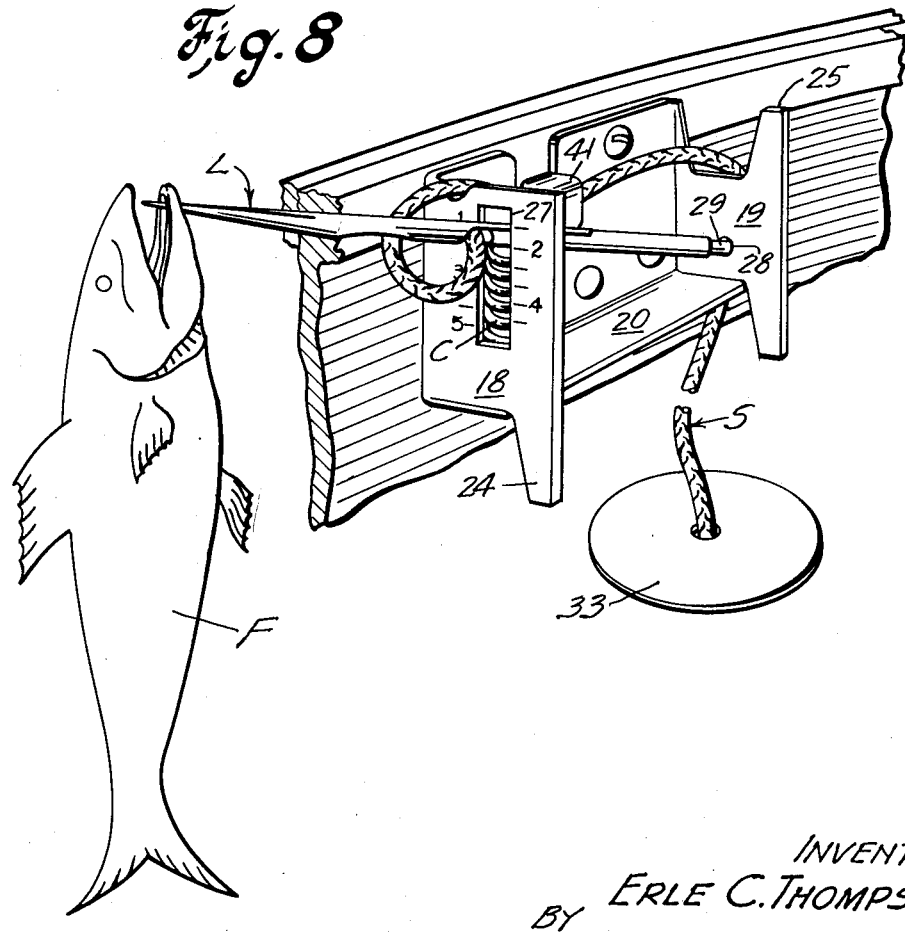

3,031,020
FISH STRINGER
Erle C. Thompson, 815 5th St., International Falls, Minn.
Filed Dec. 5, 1958, Ser. No. 778,532
6 Claims. (Cl. 177—129)

This invention relates to a self-storing, self-anchoring fish stringing device which is also adaptable for use as a scale to weigh the fish as they are caught.

An object of this invention is a fish stringing device which is mountable on a boat and permits fish to be strung thereon with only one hand if necessary.

Another object is a fish stringing device which includes a stringer, lance and mountable bracket wherein the bracket serves as a storage unit for the stringer and lance when not in use and removably engages and supports the lance and anchors the stringer during fishing.

Still another object is a device of the class described in which the stringer cooperates with the bracket to secure the lance in mounted engagement with the bracket and thereby securely anchor the stringer, with or without fish thereon, to the boat.

A further object is a fish stringing device of the class described wherein the lance serves as a lever arm and indicator and is adapted to cooperate with the bracket and a compression spring mounted on said bracket to function as a scale to weigh the fish as they are caught.

A still further object is a scale type fish stringing device of the class above described in which the lever arm of the lance is readily adjustable to permit the weighing of fishes of varying sizes.

These and other objects and advantages of my invention will more fully appear from the following description made in connection with the accompanying drawings, wherein like reference characters refer to the same or similar parts throughout the several views, and in which:

FIG. 1 is a front elevational view in partial section of one form of my invention;

FIG. 2 is a right side elevational view in partial section of the structure of FIG. 1;

FIG. 3 is a top plan view of FIG. 1;

FIG. 4 is a left side elevational view of FIG. 1;

FIGS. 5 and 6 are enlarged views of two types of lance which may be used in my invention; and FIGS. 7 and 8 are perspective views of two other different forms of my invention.

Referring to the drawings and particularly to FIGS. 1 to 4 inclusive, which illustrate one embodiment of my invention, the device of my invention broadly includes a flexible stringer S for stringing the fish F thereon, a rigid pointed impaling element or lance L affixed to said stringer and adapted to pierce the jaws of a fish so as to string the fish on the stringer, and a mountable anchoring member or bracket B having a compression spring C associated therewith, said bracket being adapted to removably engage and anchor said lance and cooperate with the lance and spring to function as a scale or weighing device to readily determine the approximate weight of the fish as they are caught.

In the form of my invention shown in FIGS. 1 to 4, the bracket B is hingedly mounted on the side or gunwale of the boat by means of a mounting plate 10 which is provided with suitable apertures 11 for securing the plate to the boat. A corner portion of the plate 10 is bent or turned downwardly to form a stringer engaging hook 12, the purpose thereof to be described in more detail hereafter.

A pair of projecting apertured flanges or hinge seats 13 and 14 are provided adjacent the other end of the mounting plate 10 forming a C-shaped end portion on the mounting plate as viewed from the side thereof, said hinge seat being adapted to pivotally engage a hinge element such as a threaded bolt 15 which is inserted therethrough and secured thereto by means of nut 16.

Bracket B, which is hingedly mounted on mounting plate 10, is of generally C-shaped configuration as viewed from the top, and consists of a back plate 17, a pair of vertically disposed end plates 18 and 19 extending transversely from said back plate, and a horizontal seat 20 extending between said end plates, said horizontal seat having mounted thereon the vertical compression spring C which is secured thereto by any suitable means such as the cap screw and nut assembly 21.

Bracket B is hingedly connected to mounting plate 10 by means of hinge bolt 15, which is inserted through and pivotally engages flange 21, which extends outwardly from the back plate transversely thereto and adjacent the right marginal edge thereof and the horizontal seat 20 in such fashion that hinge bolt 15 nests in the corner defined by back plate 17 and end plate 19, and the back plate is thereby permitted to swing through a 90 degree arc around said corner as best illustrated in FIG. 3.

A slot or opening 23 is provided in the face of the back plate 17 and is adapted to permit hook 12 to pass therethrough when the bracket and mounting plate are in flush or closed position.

To enable the stringer S to be readily wound about the bracket for storage purposes, the end plates are provided with a pair of downwardly projecting legs 24, an upwardly projecting arm 25 on plate 19, and a recess 26 on plate 18, which, in cooperation with the sides of the boat, defines a cavity or recess for partially enclosing the stringer when wound thereon.

To receive and seat or anchor the lance L the end plates are provided with suitable openings therein for engaging the lance. The left side end plate 18 has formed therein an elongate vertical slot 27 which is of a size sufficient to permit the lance to pass freely therethrough. The right side plate 19 has formed in the lower portion thereof an aperture 28 which is adapted to receive or seat one end of the lance which has an abutment shoulder formed thereon to engage the end plate 19 and prevent longitudinal displacement of the lance once it is seated in the aperture 28.

The vertical slot 27 is in substantially vertical alignment with the spring C and extends above the spring sufficiently to permit the lance to be inserted therethrough above the spring and pushed diagonally into seated engagement with an aperture 28. The slot 27, aperture 28 and spring C are so arranged that the spring bears against the lance when it is diagonally mounted on the bracket as shown in FIG. 1, the spring exerting a slight upward pressure on the lance pressing it against the end plate and helping to hold it in secure anchored engagement with the bracket. The outer face of left end plate 18 is suitably notched or marked, as best shown in FIG. 4 and is calibrated so that the weight of a fish suspended from the lance can be readily read therefrom.

The lance L is an elongated rigid member having one end thereof tapered to a point so that it can readily pierce the jaws of a fish to impale the fish thereon, the other end having a reduced portion 29 adapted for insertion into aperture 28, said reduced end portion defining an abutment shoulder 30 for engaging the end plate 18 to prevent longitudinal displacement of the lance. The upper surface of said tapered portion is preferably provided with at least one indentation and preferably a series of spaced indentations 31 which engage the fish and hold it at a predetermined point on the lance to permit relatively accurate weighing thereof. Since accurate weighing depends on a lever arm of uniform length, and since the lever arm of this device consists of the distance from the fish to the point where the reduced portion of the lance engages and is held by the end plate 19 which end plate serves as the fulcrum for this lever type weighing assembly, the fish must come to rest at the same point on the lance each time, and the indentations 31 make this possible.

To make this device suitable for weighing fish of considerably varying weights, the lance may be provided with a series of these indentations predeterminedly spaced in relation to the spring and scale so that the length of the lever arm may be shortened or lengthened according to the size of the fish being weighed, so that the same apparatus may be used to weigh both large and small fish. The device of my invention may be calibrated to read in any manner desired. Where a plurality of indentations are provided, one suggested method of determining the weight of the fish is to so calibrate the scale and space the indentations that the weight may be determined by multiplying the number of the indention by the scale reading, the indentations being numbered progressively from the outer-most indentation inwardly and the notched scale on the face of the plate 18 being numbered progressively downward. For example, the indentations might be numbered 1, 2, 3, etc., reading from left to right or inwardly, while the notches on the scale might be numbered 1, 2, 3, etc., reading downwardly, with the two being calibrated with relation to one another so that the weight of the fish may be determined by multiplying the number of the notch which holds the fish by the number of the notch opposite the lance or indicator which has been displaced downwardly by the weight of the fish thereon. Thus, a fish placed in indentation 1 which caused displacement of the lance to notch 3 on the scale would be a 3 pound fish; a fish in indentation 2 causing displacement to notch 4 would weigh 8 pounds, etc.

Another convenient method of varying the length of the lever arm to accommodate the weighing of different sized fishes is to provide a series of spaced recesses 32 in the lower end of the lance, as shown in FIG. 6, so that the length of the lever arm may be varied by engaging the proper recess with aperture 28.

The stringer S is an elongate flexible cord-like member having a retaining means such as ring 33 attached thereto for preventing displacement of the fish from the stringer, the upper end of the stringer being affixed or attached to the lance intermediate the ends thereof, the point of attachment being such that the stringer does not interfere with the insertion of the lance through slot 27.

In operation, the stringer is permitted to hang free either inside or outside the boat, and the lance is mounted diagonally on the bracket as shown in FIG. 1, which may be in closed or open position as desired. When a fish is caught, it is impaled on the lance by inserting the tapered end thereof through the jaws of the fish which is slid downwardly thereon until engaging one of the appropriate indentations. The weight of the fish is then determined, as previously described, following which the lance is grasped outwardly of the fish and removed from the bracket to a substantially vertical position. The weight of the fish causes it to slide downwardly on the lance and onto the stringer. The lance is then reseated in the bracket and the fish may be thrown overboard into the water. To prevent the lance being pulled from the bracket by the fish trailing in the water, which creates a drag on the stringer and the lance, the bracket is closed as shown in FIGS. 1 and 3 and the stringer is looped over end plate 18 and under hook 12 in tight fitting engagement therewith to lock the lance in mounted anchored engagement with the bracket. Under this arrangement, any pull on the stringer created by the fish trailing in the water tends to pull the lance towards the bracket and hold it therein. When another fish is caught, the stringer is released from the hook and the previously described operation is repeated.

In the form of my invention illustrated in FIG. 7 the bracket B' is designed to function only as an anchor and storage rack for the stringer and lance, and does not double as a weighing device. In this modification, the bracket B' is also a C-shaped member as viewed from the top, having a back plate 34 and similar vertical end plates 35 transversely projecting from the marginal edge thereof. The end plates are provided with downwardly projecting legs 36 and upwardly extending arms 37 which together form a recessed rack for winding the stringer thereon. Each of the end plates is also provided with a large aperture 38 adapted to insert the lance therethrough in the upper portion thereof adapted to receive and seat the reduced end portion 29 of the lance when it is mounted diagonally on the bracket. The bracket may be permanently mounted on the boat by suitable means such as screws or bolts, or may be removably mounted by sliding the bottom portion of the back plate 34 into a retaining sleeve (not shown) mounted on the boat. Bracket B' operates in much the same manner as bracket B of the previous illustration, with the exception of the weighing feature. The lance is diagonally mounted on the bracket by inserting it through either of the large apertures and seating it in the smaller aperture of the opposing plate. The lance is locked in mounted position by looping the stringer of the end plate under the hook 40 so that any drag on the line by the trailing fish will tend to pull and hold the lance in seated mounted engagement.

The form of my invention as illustrated in FIG. 8 is a modified version of that illustrated in FIGS. 1 to 4 inclusive and previously herein described, the only difference being that in this modification the bracket is fixedly and not hingedly mounted, and the mounting plate and hinge mechanism are eliminated. In addition, the stringer engaging locking hook 41 is transferred from the mounting plate and is integrally formed of the back plate of the bracket. Except for being fixedly, instead of hingedly mounted, this form of my invention operates and functions in all respects in the same manner as previously described for that form of my invention illustrated in FIGS. 1 to 4 inclusive.

It will, of course, be understood that various changes may be made in the form, details, arrangement and proportions of the various parts without departing from the scope of my invention.

What is claimed is:

1. A device for stringing fish and the like comprising a mountable anchoring member including a pair of spaced supporting members projecting therefrom, an elongate fish impaling element, said impaling element being adapted for detachable cooperative engagement with said supporting members so as to be removably supported and held thereby in fish impaling position, an elongate flexible element secured to said impaling element and adapted for stringing a fish or plurality or fish thereon, means secured to said flexible element for preventing displacement of said fish from said flexible element, and hook means carried by the anchoring member adapted to removably engage and slidably hold said flexible element in such position that a pull on the free end of said flexible member tends to pull the impaling element into anchoring engagement with said anchoring member while permitting the impaling element to be withdrawn from anchoring engagement with said supporting members without disengaging the flexible member from said hood means.

2. A device for weighing and stringing fish comprising an anchoring member adapted for mounting on a side wall of a boat including a pair of outwardly extending spaced supporting members, a flexible element having retaining means thereon adapted to string a fish or plurality of fish thereon, said flexible element having affixed to one end thereof a rigid impaling element, one end thereof having a tapered portion adapted to be inserted into the jaws of a fish to secure the fish thereto, said impaling element having means for retaining the fish in at least one fixed position thereon, one of said supporting members having a slot formed integrally thereof and adapted to receive and enclose the impaling element therein, the opposing supporting member having an aperture therein disposed to receive and seat one end of said impaling element to permit the impaling element to be supported therebetween in diagonal fashion, spring means secured to said anchoring member and adapted to bear upwardly against the impaling element when it is diagonally mounted on said supporting members, the slotted supporting member having indicator means thereon, the values of which have been predetermined in relation to the spring means and the cooperative engagement therewith of the impaling element which serves as an indicator and lever therefor to weigh said fish, and locking means adapted to engage the flexible element to assist in securing the impaling element in anchored engagement with the outwardly projecting supporting members.

3. A device for stringing and weighing fish, said device comprising an anchoring member adapted for mounting on a boat, said anchoring member having a pair of spaced supporting plates extending transversely outwardly therefrom, one of said plates having a vertically extending slotted opening therein, a flexible member for stringing fish thereon having attached thereto at one end thereof an elongate tapered fish impaling element adapted to be removably inserted through said slotted opening and vertically movable therein and engaged by said other plate so as to be diagonally supported thereby, a spring mechanism adapted to engage and bear against the impaling element when it is resting thereon in supported engagement with the outwardly projecting supporting members, indicator means predeterminedly calibrated with respect to the vertical movement of the impaling element in cooperation with the spring mechanism for reading the weight of the fish when the fish is impaled at a predetermined point on the spring suported impaling element and means for adjusting the lever arm of the impaling element to permit fish of widely varying weights to be weighed on the same simple scale arrangement.

4. A fish stringing device having in combination an elongated flexible member adapted to string fish thereon, one end of said flexible member being connected to an elongate rigid fish impaling element intermediate the ends of said element, a generally U-shaped mountable anchoring member, the opposing sides of said anchoring member being adapted to removably receive and support one end portion of said impaling element therebetween and prevent longitudinal movement thereof in one direction, the bight portion of said anchoring member having an inwardly extending hook element disposed intermediate the anchored end of said impaling element and the point of connection between said flexible member and said impaling element and adapted to receive and frictionally engage said flexible member in such fashion that a pull on said flexible member intermediate said hook and the unanchored end of said flexible member forces said impaling element into engagement with the anchoring member.

5. A device for weighing and stringing fish comprising an anchoring member adapted for mounting on a side wall of a boat including a pair of outwardly extending spaced supporting members, a flexible element having retaining means thereon adapted to string a fish or plurality of fish thereon, said flexible element having affixed to one end thereof a rigid impaling element, one end thereof having a tapered portion adapted to be inserted into the jaws of a fish to secure the fish thereto, said impaling element having means for retaining the fish in at least one fixed position thereon, one of said supporting members having a slot formed integrally thereof and adapted to receive and enclose the impaling element therein, the opposing supporting member having an aperture therein disposed to receive and seat one end of said impaling element to permit the impaling element to be supported therebetween in diagonal fashion, spring means secured to said anchoring member and adapted to bear upwardly against the impaling element when it is diagonally mounted on said supporting members, the slotted supporting member having indicator means thereon, the values of which have been predetermined in relation to the spring means and the cooperative engagement therewith of the impaling element which serves as an indicator and lever therefor to weigh said fish.

6. A fish stringing device having in combination an elongate flexible member adapted to string the fish thereon, a fish impaling element connected to said flexible member and adapted to guide said fish onto said flexible member, a mountable anchoring member adapted for mounting on a side of a boat and adapted to removably engage and anchor said impaling element in such fashion that one end of said anchored impaling element is capable of limited movement in a substantially vertical plane, means carried by the anchoring member providing a yielding resistance to the vertical movement of the impaling element, and means carried by said anchoring member for determining the weight of a fish freely suspended from said impaling element based on the vertical displacement of said impaling member caused thereby, said flexible member having said impaling element mounted on one end thereof and having said other end provided with fish retaining means adapted to be freely suspended in the water when the impaling element is mounted on said anchoring member, said impaling element when mounted being disposed generally parallel to the side of the boat in generally horizontal position, and means for detachably frictionally engaging the flexible member and positioning that portion of the flexible member adjacent the impaling element in such fashion that a drag on the flexible member tends to hold said impaling element in anchored relationship with said anchoring member, said flexible member being freely movable with respect to said means when the impaling element is disengaged from the anchoring member so as not to interfere with said disengaging movement.

References Cited in the file of this patent
UNITED STATES PATENTS

| | | |
|---|---|---|
| 872,961 | Neddo | Dec. 3, 1907 |
| 2,455,766 | Harvey | Dec. 7, 1948 |
| 2,541,146 | Bahr | Feb. 13, 1951 |
| 2,572,653 | Mulsow | Oct. 23, 1951 |
| 2,599,057 | Jarabek | June 3, 1952 |
| 2,816,750 | Martin | Dec. 17, 1957 |